US010522175B1

(12) United States Patent
Horgan

(10) Patent No.: US 10,522,175 B1
(45) Date of Patent: Dec. 31, 2019

(54) MULTI-ACCESS HARD DISC DRIVE

(71) Applicant: Seagate Technology LLC, Cupertino, CA (US)

(72) Inventor: Sean M. Horgan, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/114,933

(22) Filed: Aug. 28, 2018

(51) Int. Cl.
 *G11B 5/48* (2006.01)

(52) U.S. Cl.
 CPC .......... *G11B 5/4813* (2013.01); *G11B 5/4833* (2013.01)

(58) Field of Classification Search
 None
 See application file for complete search history.

(56) References Cited

U.S. PATENT DOCUMENTS

| | | | | |
|---|---|---|---|---|
| 4,423,448 A | * | 12/1983 | Frandsen | G11B 5/5521 360/246.7 |
| 4,577,240 A | * | 3/1986 | Hedberg | G11B 5/5521 360/22 |
| 5,223,993 A | * | 6/1993 | Squires | G06F 3/0601 360/246.7 |
| 5,293,282 A | | 3/1994 | Squires et al. | |
| 5,343,347 A | * | 8/1994 | Gilovich | G11B 5/4813 360/246.7 |
| 5,355,486 A | * | 10/1994 | Cornaby | G11B 19/02 360/77.08 |
| 6,057,990 A | * | 5/2000 | Gilovich | G11B 5/4893 360/246.7 |
| 6,081,399 A | * | 6/2000 | Lee | G11B 5/4886 360/61 |
| 6,560,075 B2 | | 5/2003 | Price et al. | |
| 6,678,120 B2 | * | 1/2004 | Money | G11B 5/5521 360/264.2 |

(Continued)

FOREIGN PATENT DOCUMENTS

JP  10199173 A  *  7/1998
JP  2002324371 A  *  11/2002

(Continued)

OTHER PUBLICATIONS

"Combination of Rotary and Linear Actuators", IBM Technical Disclosure Bulletin, Mar. 1984, vol. No. 26, pp. 5393-5394. (Year: 1984).*

*Primary Examiner* — William J Klimowicz

(57) ABSTRACT

Aspects of the disclosure are directed to apparatuses and methods involving an apparatus operable for read/write access to data storage media. As may be consistent with one or more embodiments, a hard disc drive apparatus includes respective e-blocks mounted in different corners of an enclosure (e.g., base deck) having storage media therein. Each e-block has one or more actuator arms having a read/write head thereon and a voice coil that rotates the actuator arm about an axis. The respective e-blocks are operable for read/write access to different regions of the storage media (e.g., with a longer actuator arm utilized for accessing an inner region of disc media, and a shorter actuator arm utilized for accessing an outer region of disc media). The number, size and rotational limits of the respective e-blocks are utilized to facilitate the use of a compact enclosure design while achieving high-speed data access.

19 Claims, 3 Drawing Sheets

(56) References Cited

U.S. PATENT DOCUMENTS

| | | | | |
|---|---|---|---|---|
| 7,102,842 B1* | 9/2006 | Howard | ............... | G11B 5/5521 |
| | | | | 360/61 |
| 7,199,981 B2* | 4/2007 | Zabtcioglu | ............. | G11B 5/012 |
| | | | | 360/266.2 |
| 7,385,781 B1* | 6/2008 | Craig | ................... | G06F 3/0676 |
| | | | | 360/77.01 |
| 7,430,091 B2* | 9/2008 | Manasse | ............. | G11B 5/5578 |
| | | | | 360/75 |
| 7,961,435 B2* | 6/2011 | Lee | ..................... | G11B 5/5569 |
| | | | | 360/246.7 |
| 9,613,658 B2* | 4/2017 | Engelkes | ............. | G11B 23/505 |
| 9,830,939 B1* | 11/2017 | Hamilton | ............ | G11B 5/5578 |
| 9,911,442 B1* | 3/2018 | Kharisov | ............ | G11B 5/5547 |
| 9,928,861 B1* | 3/2018 | Erden | ................. | G11B 5/5534 |
| 10,002,625 B1* | 6/2018 | Erden | ................. | G11B 5/4886 |
| 10,037,779 B1* | 7/2018 | Mendonsa | ............ | G11B 21/08 |
| 10,043,543 B1* | 8/2018 | Buch | .................. | G11B 5/59627 |
| 2004/0179465 A1* | 9/2004 | Kuwajima | ........... | G11B 5/5521 |
| | | | | 369/300 |
| 2007/0297083 A1* | 12/2007 | van Zyl | ............... | G11B 5/4806 |
| | | | | 360/69 |
| 2012/0250177 A1* | 10/2012 | Somanache | ......... | G11B 5/4813 |
| | | | | 360/55 |
| 2017/0309304 A1* | 10/2017 | Tan | ..................... | G11B 5/5578 |
| 2018/0174613 A1* | 6/2018 | Zhu | ........................ | G11B 5/012 |

FOREIGN PATENT DOCUMENTS

| | | | | |
|---|---|---|---|---|
| KR | 20040043606 A | * | 5/2004 | |
| WO | WO-2006044884 A2 | * | 4/2006 | ........... G11B 5/4813 |

\* cited by examiner

MULTI-ACCESS HARD DISC DRIVE

OVERVIEW

Various example embodiments are directed to methods and/or apparatuses involving read and/or write access to storage media. Various such embodiments address issues that may relate to rapid data access and achieving compact designs. For instance, access to data on storage mediums may not be fast enough to meet the needs of certain applications. Further, form factors associated with various componentry can prevent the implementation of larger components, thus restricting the space available for data storage componentry. Accordingly, achieving faster data access under space constraints can be particularly challenging.

Various aspects of the present disclosure are directed to addressing such challenges. For instance, various embodiments are directed to apparatuses and/or related methods involving the use of multiple (two or more) read/write heads on actuator arms located in different portions of a hard disc drive enclosure. Various such aspects involve the utilization of respective e-blocks sized and positioned to access different portions of a disc storage medium, which facilitates operation of the respective e-blocks with limited rotation and related compact sizing of a surrounding enclosure.

In accordance with particular embodiments, a hard disc drive apparatus includes a base deck, a storage medium connected to spindle and motor in the base deck, and first and second e-blocks mounted in opposing corners of the base deck for read/write access to the storage medium. The motor and spindle are configured and arranged to rotate the storage medium for read/write access thereto. The first e-block includes an actuator arm that rotates about an axis, a read/write head attached to the actuator arm, and a voice coil connected to the actuator arm and configured and arranged therewith to position the read/write head along an arc extending over a first portion of the storage medium. The second e-block includes an actuator arm that rotates about an axis, a read/write head attached to the actuator arm, and a voice coil connected to the actuator arm and configured and arranged therewith to position the read/write head along an arc extending over a second portion of the storage medium that is different than the first portion of the storage medium.

As may be implemented in accordance with one or more embodiments, a hard disc drive apparatus includes a plurality of circular storage mediums spaced apart from one another in a stacked arrangement, each storage medium being configured and arranged to rotate about a central axis. A rectangular base deck is configured and arranged to house the plurality of storage mediums, as well as first and second e-blocks. The first e-block is mounted in a first corner of the base deck and includes a plurality of actuator arms that rotate about a first axis and, for each actuator arm, a read/write head attached to an end of the actuator arm, and a voice coil configured and arranged to position the read/write head along an arc over a first portion of the storage mediums by rotating the actuator arm. The second e-block is mounted in a second corner of the base deck that is opposite the first corner, the second e-block including a plurality of actuator arms that rotate about a second axis and, for each actuator arm, a read/write head attached to an end of the actuator arm, and a voice coil configured and arranged to position the read/write head along an arc over a second portion of the storage mediums by rotating the end of the actuator arm, the second portion being different than the first portion. The voice coils and actuator arms of the second e-block are smaller than the voice coils and actuator arms of the first e-block.

Various methods are implemented for providing access to storage media. In accordance with one or more embodiments, a hard disc drive apparatus as characterized above is provided. The spindle and motor are utilized to rotate the storage medium for read/write access thereto. Read/write access is provided to a first portion of the storage medium with the first e-block by utilizing the voice coil to rotate the actuator arm about an axis to move the read/write head along an arc extending over the first portion of the storage medium. Read/write access is provided to a second portion of the storage medium with the second e-block by utilizing the voice coil to rotate the actuator arm about an axis to move the read/write head along an arc extending over the second portion of the storage medium, the second portion of the storage medium being different than the first portion of the storage medium. In some implementations, in response to receiving a read/write access request, one of the first and second portions of the storage medium to be accessed is identified based on the request. One of the first and second e-blocks is then selected based on the identified one of the first and second portions of the storage medium to be accessed. The selected one of the first and second e-blocks is controlled to position the actuator arm and read/write head thereof for serving the request, and the requested read/write access is provided via the positioned actuator arm and read/write head of the selected one of the first and second e-blocks.

The above overview is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, as depicted herein.

Figure 1:
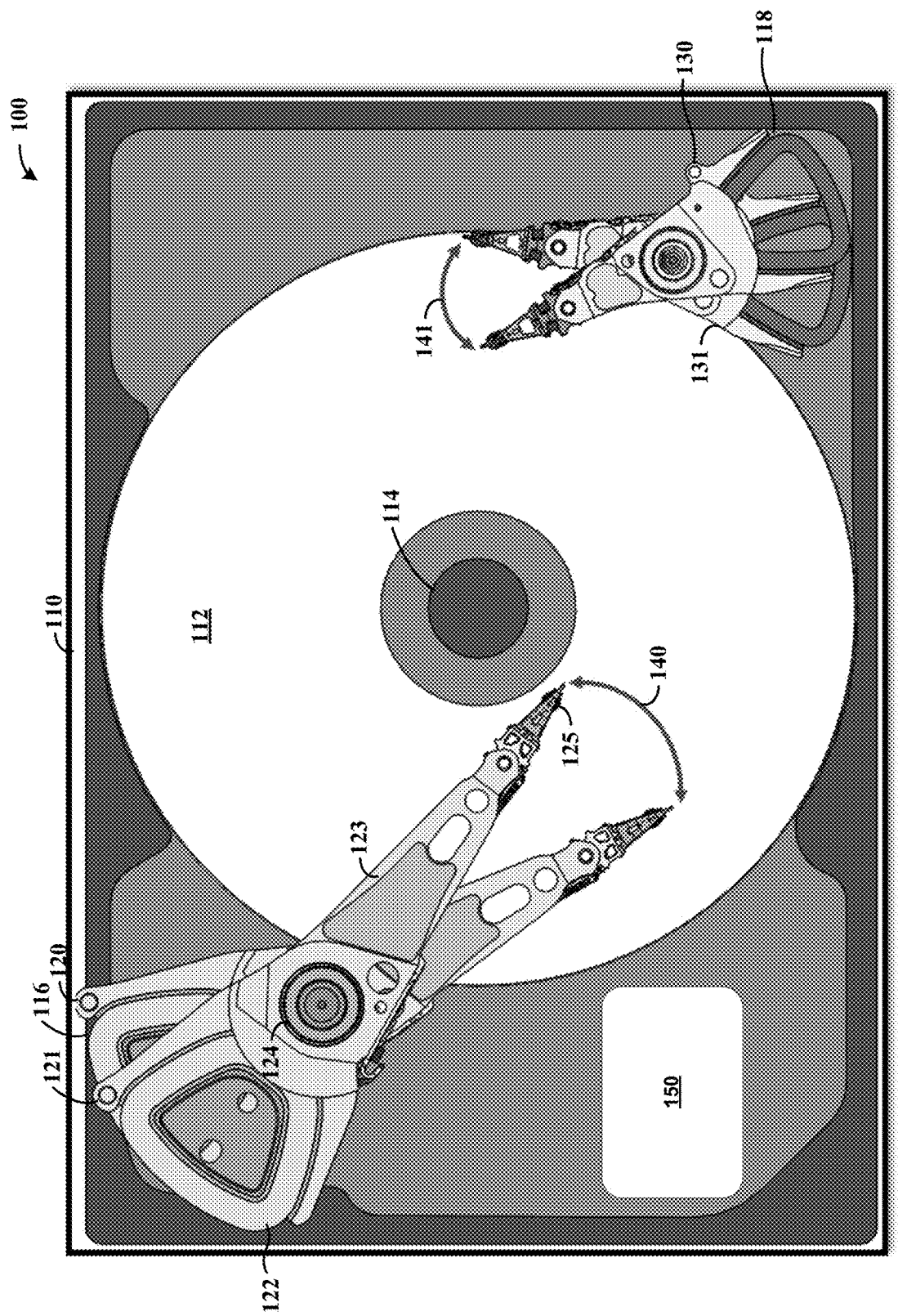
FIG. 1 shows a disc drive apparatus, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving data storage media and related componentry. In certain implementations, aspects of the present disclosure have been shown to be beneficial when used in the context of providing fast and reliable access to data in a compact environment, such as with hard disc drive enclosures. While not necessarily so limited, various aspects may be appreciated through a discussion of examples using such exemplary contexts.

Various embodiments utilizing two or more e-blocks positioned in different locations of a hard disc drive enclosure. The respective e-blocks have actuator arms of differing length and operable for rotating to access different portions of a storage medium. For instance, each actuator arm may be rotated through a limited arc segment that is sufficient for accessing a designated portion of the storage medium. In connection with such embodiments, it has been discovered/recognized that, by utilizing different types of e-blocks arranged it this manner, sizing and rotation of the e-blocks can be limited to facilitate the use of a compact enclosure design. For instance, a smaller actuator arm can be utilized to access an outer portion of a disc, with relatively limited arc movement and a relatively smaller voice coil. A larger actuator arm may still be utilized for accessing inner portions of the disc (closer to the disc's axis of rotation), yet can be operated within a relatively limited arc of rotation as the larger arm would not necessarily need to access the outer portion of the disc. Accordingly, such limited arc movement (and where applicable, smaller voice coil) can facilitate relatively tight positioning of the e-blocks within a hard disc drive enclosure.

In accordance with a particular embodiment, a hard disc drive apparatus includes a base deck, a storage medium connected to spindle and motor in the base deck, and first and second e-blocks mounted in opposing corners of the base deck to provide read/write access to different portions of the storage medium. Each e-block includes an actuator arm that rotates about an axis, a read/write head attached to the actuator arm, and a voice coil connected to the actuator arm for positioning the read/write head along an arc.

The voice coil and actuator arm of the second e-block can be smaller than the voice coil and actuator arm of the first e-block, with the first e-block providing read/write access to data stored in an inner region of the storage medium, relative to the spindle, and the second e-block providing read/write access to data stored in an outer region of the storage medium, relative to the spindle. Such an arrangement in which the second e-block is smaller can be implemented with a rectangular base deck having a length that is greater than its width, with the spindle and storage medium offset laterally along the length of the base deck in a direction toward the second e-block, and the axis/voice coil of the second e-block being confined in a relatively small space. For instance, the space laterally between the storage medium and corner sidewalls of the base deck for the second e-block can is smaller than a corresponding space in an opposing corner for the first e-block.

Consistent with the above, the rotation of the respective e-blocks can be relatively small such that space around the e-blocks may be confined in a variety of manners. In some embodiments, voice coils and axes of the first and second e-blocks are positioned laterally between a perimeter edge of the storage medium and respective sidewalls of the base deck that form the first and second corners. The base deck is sized such that limited rotation of the respective voice coils is facilitated about their respective axes for rotating the read/write heads across the storage medium for data access to the respective first and second portions of the storage mediums, and such that the respective sidewalls in each corner intersect an arc along which the respective voice coils traverse. For instance, the respective sidewalls can be spaced closely relative to each e-block with a limited tolerance such that rotation of either voice coil beyond a limited rotation providing the needed data access would result in the voice coil contacting the sidewall.

Various embodiments further include a read/write control circuit that responds to requests for data accesses as follows. In response to a request for access to data near an inner region of the storage medium near the spindle, the first e-block is selected and actuated to position its read/write head for accessing the requested data. In response to a request for access to data near an outer region of the storage medium near the storage medium's perimeter, the second e-block is selected and actuated to position its read/write head for accessing the requested data.

As may be implemented in accordance with one or more particular embodiments, a hard disc drive apparatus includes a plurality of circular storage mediums spaced apart from one another in a stacked arrangement, each storage medium being configured and arranged to rotate about a central axis. A rectangular base deck houses the storage mediums as well as first and second e-blocks mounted in opposing corners of the base deck. Each e-block includes actuator arms that rotate about a first axis with a read/write head attached to the end of each actuator arm, and a voice coil that positions the read/write head along an arc. The first e-block positions its read/write heads over a first portion of the storage mediums, and the second e-block positions its read/write head over a second, different portion of the storage mediums. The voice coils and actuator arms of the second e-block are smaller than the voice coils and actuator arms of the first e-block.

The space confinement of the respective e-blocks can thus be tailored to suit particular applications. In some embodiments, the second axis and voice coil of the second e-block are confined in a space between the storage mediums and corner sidewalls of the base deck that is smaller than a space between the storage mediums and corner sidewalls of the base deck in which the first axis and voice coil of the first e-block are confined. In certain embodiments, the first portion of the storage mediums is near the central axis of the storage mediums, and the second portion of the storage mediums is nearer an outer circumference of the storage mediums, relative to the first portion of the storage mediums (e.g., a smaller e-block can access the outer portion more easily). For example, the second actuator arms of the second e-block may extend from the second axis to the ends thereof that is less than a distance from the second axis to an inner region of the storage mediums that contains data.

In various contexts, where the base deck has a length and width with the length being greater than the width, the storage mediums can be off-centered in the base deck along its length. For instance, the width of the base deck can be very close to the diameter of the storage mediums (e.g., greater than a diameter of the storage mediums to allow movement thereof, but less than 10 percent greater than the diameter of the storage mediums).

In various embodiments, the voice coils and actuator arms of the respective first and second e-blocks are on opposite sides of the axis about which they rotate, and the base deck, first e-block and second e-block are dimensioned such that, for each e-block, at least one sidewall of the base deck intersects an arc along which the voice coil rotates. Outermost portions of the voice coils, relative to the axis about which they rotate, may thus arc as the actuator arm rotates. The arc along which an outermost portion of the voice coil of the first e-block rotates is offset from the first axis at a greater distance than the arc along which the outermost portion of the voice coil of the second e-block rotates is offset from the second axis, which may be facilitated by offset storage mediums.

In certain embodiments, a read/write control circuit controls actuation of the first and second e-blocks for respectively accessing first and second sets of data storage locations on the storage mediums by applying an electrical signal to the respective voice coils of the e-blocks. At least some of the first set of data storage locations may be mutually exclusive of at least some of the second set of data storage locations, and one or more of the first set of data storage locations may include at least one of the second set of data storage locations (e.g., the respective actuator arms may access overlapping storage locations). In some embodiments, the first e-block is configured and arranged with the second e-block to access all read/write areas of the storage mediums by traversing the read/write heads of the first e-block for accessing a first set of the read/write areas in the first portion of the storage mediums, and traversing the read/write heads of the second e-block for accessing a second set of the read/write areas in the second portion of the storage mediums. The first and second sets of the read/write areas may be different from one another and making up all of the read/write areas of the storage mediums.

A variety of base decks may be implemented to suit particular embodiments. Such base decks may have a bottom and vertical sidewalls extending upward therefrom and above the storage mediums and e-blocks. The vertical sidewalls may be configured to couple to a top cover that, when sealed to the vertical sidewalls, encloses the storage mediums and e-blocks.

Turning now to the figures, FIG. 1 shows a disc drive apparatus 100 as may be implemented in accordance with one or more embodiments. The apparatus 100 includes a base deck 110 that houses one or more storage mediums 112 that rotate about a spindle 114, as well as multiple e-blocks 120, 121, 130 and 131. Referring to e-block 121, a voice coil 122 operates to rotate an actuator arm 123 about an axis 124 to position a read/write head 125 along an arc 140 for accessing an inner region of the storage medium 112. The other e-blocks have similar componentry, not labeled for brevity, with e-block 120 exhibiting a similar positioning along arc 140, and e-blocks 130 and 131 being sized and controlled for accessing an outer region of the storage medium 112, along arc 141. The respective pairs of e-blocks may be positioned at different levels where multiple storage mediums (as 112) are stacked. The respective arcs 140 and 141 that each e-block traverses provide, collectively between the e-blocks, access to data across the storage mediums. Controller circuitry 150 may be implemented within the base deck 110 as shown, or otherwise positioned and coupled relative to the e-blocks in a hidden manner, or implemented externally.

The base deck 110 is longer than it is wide, with the width being sufficient to house the storage mediums 112 (e.g., with an inner sidewall dimension of the base deck being as large as a diameter of the storage mediums, plus a tolerance for additional space). In connection with one or more aspects of FIG. 1, it has been recognized/discovered that utilizing the base deck as shaped along with offsetting the storage mediums 112 and limiting the range of respective e-block access to the storage mediums, multiple e-blocks can be utilized per storage medium to increase access (read/write) speed while maintaining a compact form factor. For instance, referring to e-block 121, it's placement relative to the sidewall of the base deck 110 (e.g., at point 116) can be restricted because the e-block need only access data near the interior of the storage medium 112 (arc 140), without needing the clearance to the sidewall otherwise necessary to access the outer regions of the storage medium. Similarly, e-block 130 need only access the outer regions of the storage medium 112 (arc 141), and can thus be placed in close proximity to the inner sidewall of the base deck 110 (e.g., at point 118) as the e-block need not rotate any further relative to the sidewall for positioning its read/write head near the inner portion of the storage medium.

Figure 2:
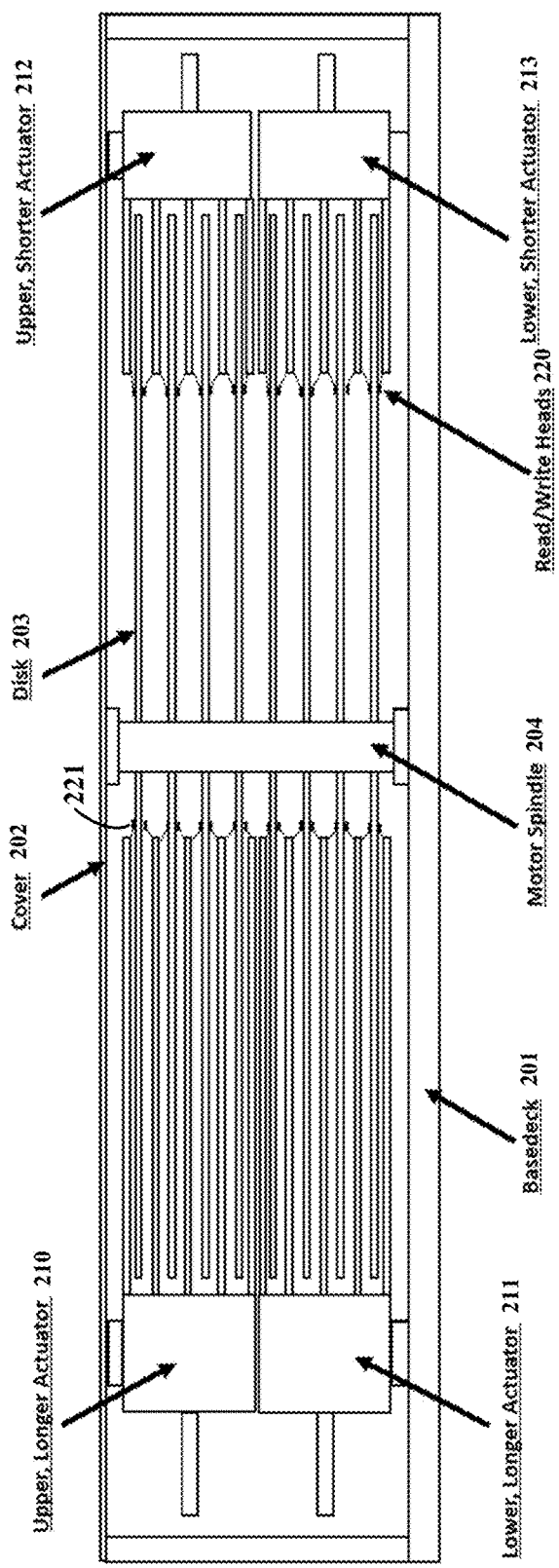
FIG. 2 shows a disc drive apparatus, as may be implemented in accordance with one or more embodiments.

FIG. 2 shows a disc drive apparatus 200, as may be implemented in accordance with one or more embodiments. The apparatus 200 includes a base deck 201 and cover 202 that enclose a plurality of stacked storage mediums including disk 203, which rotate about a motor spindle 204. The apparatus 200 also includes a plurality of actuators/e-blocks including longer actuators 210 and 211 that operate for accessing an inner portion of the storage mediums, and shorter actuators 212 and 213 that operate for accessing an outer portion of the storage mediums, respectively via read/write heads 220 and 221 at the lower and shorter actuators. The apparatus 200 may, for example, be implemented with actuators and other aspects as shown in and described in connection with FIG. 1. Further, the apparatus in FIG. 1 can be implemented with four actuators and a plurality of stacked storage mediums as shown in FIG. 2.

Figure 3:
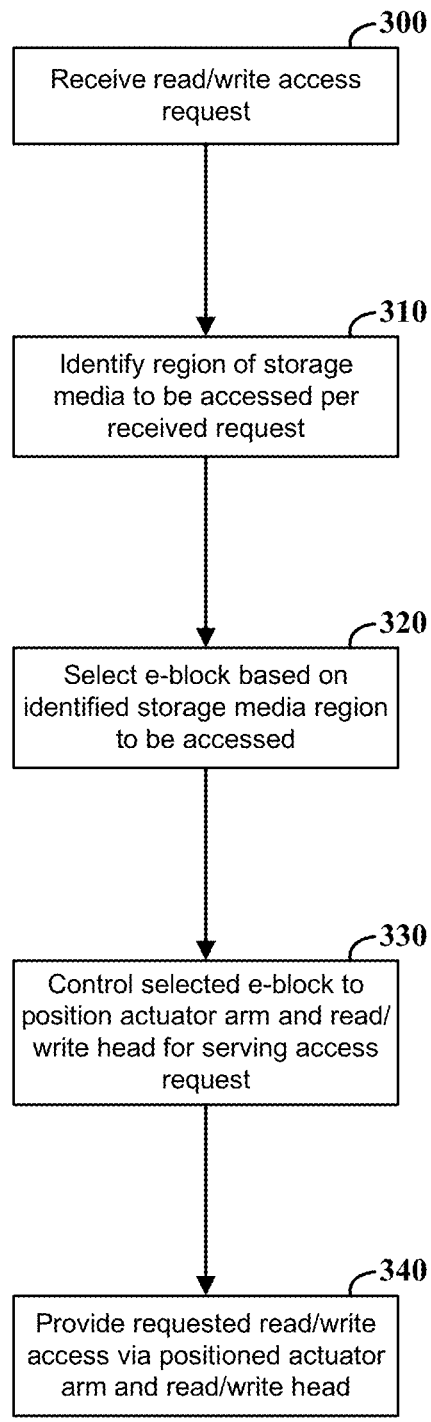
FIG. 3 shows a method for accessing data using multiple e-blocks, in accordance with one or more embodiments.

FIG. 3 shows a method for accessing data using multiple e-blocks, in accordance with one or more embodiments. At block 300, a read/write access request is received, and a region of storage media to be accessed via the request is identified at block 310. An e-block is selected based on the identified storage media region at block 320. For instance, where implemented with FIG. 2, the upper, longer actuator 210 may be selected where the identified storage media region is an inner region of disk 203. At block 330, the selected e-block is controlled to position the actuator arm and its read/write head for serving the access request (e.g., for reading data from, or writing data to, the identified storage media region). The requested read/write access is then provided via the positioned actuator arm and read/write head at block 340. Such an approach can be utilized with FIG. 2 as noted above, or with the apparatus 100 in FIG. 1.

Based upon the above discussion and illustrations, those skilled in the art will readily recognize that various modifications and changes may be made to the present disclosure without strictly following the exemplary embodiments and applications illustrated and described herein. For example, different arrangements of e-blocks and sizing may be used, and different control mechanisms may be used. Further, while various example materials, sizes and arrangements are shown in the figures and/or described, such aspects may be implemented in embodiments involving other materials, sizes or arrangements. Such modifications do not depart from the true spirit and scope of the present disclosure, including that set forth in the following claims.

What is claimed is:

1. A hard disc drive apparatus comprising:
   a plurality of circular storage mediums spaced apart from one another in a stacked arrangement, each storage medium being configured and arranged to rotate about a central axis;
   a rectangular base deck configured and arranged to house the plurality of storage mediums;
   a first e-block mounted in a first corner of the base deck, the first e-block including a plurality of actuator arms that rotate about a first axis and, for each actuator arm, a read/write head attached to an end of the actuator arm, and a voice coil configured and arranged to position the read/write head along an arc over a first portion of the storage mediums by rotating the actuator arm;

a second e-block mounted in a second corner of the base deck that is opposite the first corner, the second e-block including a plurality of actuator arms that rotate about a second axis and, for each actuator arm, a read/write head attached to an end of the actuator arm, and a voice coil configured and arranged to position the read/write head along an arc over a second portion of the storage mediums by rotating the end of the actuator arm, the second portion being different than the first portion; and the voice coils and actuator arms of the second e-block being smaller than the voice coils and actuator arms of the first e-block.

2. The apparatus of claim 1, wherein the second axis and voice coil of the second e-block are confined in a space between the storage mediums and corner sidewalls of the base deck that is smaller than a space between the storage mediums and corner sidewalls of the base deck in which the first axis and voice coil of the first e-block are confined.

3. The apparatus of claim 1, wherein
the first portion of the storage mediums is near the central axis of the storage mediums, and
the second portion of the storage mediums is nearer an outer circumference of the storage mediums, relative to the first portion of the storage mediums.

4. The apparatus of claim 1, wherein the second actuator arms of the second e-block extend from the second axis to the ends thereof that is less than a distance from the second axis to an inner region of the storage mediums that contains data.

5. The apparatus of claim 1, wherein
the base deck has a length and width, the length being greater than the width; and
the plurality of storage mediums are off-centered in the base deck along its length.

6. The apparatus of claim 5, wherein the width of the base deck is greater than a diameter of the storage mediums and less than 10 percent greater than the diameter of the storage mediums.

7. The apparatus of claim 1, wherein
the voice coils and actuator arms of the respective first and second e-blocks are on opposite sides of the axis about which they rotate, and
the base deck, first e-block and second e-block are dimensioned such that, for each e-block, at least one sidewall of the base deck intersects an arc along which the voice coil rotates.

8. The apparatus of claim 7, wherein
the voice coils have outermost portions thereof, relative to the axis about which they rotate; and
the arc along which an outermost portion of the voice coil of the first e-block rotates is offset from the first axis at a greater distance than the arc along which the outermost portion of the voice coil of the second e-block rotates is offset from the second axis.

9. The apparatus of claim 1, further including a read/write control circuit configured and arranged to:
control actuation of the first e-block for accessing a first set of data storage locations on the storage mediums by applying an electrical signal to the voice coil of the first e-block, the first set of data storage locations being in the first portion of the storage mediums; and
control actuation of the of the second e-block for accessing a second set of data storage locations on the storage mediums by applying an electrical signal to the voice coil of the second e-block, the second set of data storage locations being in the second portion of the storage mediums.

10. The apparatus of claim 9, wherein at least some of the first set of data storage locations are mutually exclusive of at least some of the second set of data storage locations.

11. The apparatus of claim 9, wherein at least one of the first set of data storage locations include at least one of the second set of data storage locations.

12. The apparatus of claim 1, wherein the first e-block is configured and arranged with the second e-block to access all read/write areas of the storage mediums by,
traversing the read/write heads of the first e-block for accessing a first set of the read/write areas in the first portion of the storage mediums, and
traversing the read/write heads of the second e-block for accessing a second set of the read/write areas in the second portion of the storage mediums, the first and second sets of the read/write areas being different from one another and making up all of the read/write areas of the storage mediums.

13. The apparatus of claim 1, wherein the base deck has a bottom and vertical sidewalls extending upward therefrom and above the storage mediums and e-blocks, the vertical sidewalls being configured and arranged to couple to a top cover that, when sealed to the vertical sidewalls, encloses the storage mediums and e-blocks.

14. A hard disc drive apparatus comprising:
a base deck;
in the base deck, a storage medium connected to a spindle and motor configured and arranged to rotate the storage medium for read/write access thereto;
a first e-block mounted in a first corner of the base deck, the first e-block including:
an actuator arm that rotates about an axis,
a read/write head attached to the actuator arm, and
a voice coil connected to the actuator arm and configured and arranged therewith to position the read/write head along an arc extending over a first portion of the storage medium; and
a second e-block mounted in a second corner of the base deck that is opposite the first corner, the second e-block including:
an actuator arm that rotates about an axis,
a read/write head attached to the actuator arm, and
a voice coil connected to the actuator arm and configured and arranged therewith to position the read/write head along an arc extending over a second portion of the storage medium that is different than the first portion of the storage medium,
wherein the voice coils and axes of the first and second e-blocks are positioned laterally between a perimeter edge of the storage medium and respective sidewalls of the base deck that form the first and second corners, the base deck being sized such that the respective sidewalls are spaced from each e-block with a limited tolerance such that rotation of either voice coil beyond the respective arcs results in the voice coil contacting the sidewall.

15. The apparatus of claim 14, wherein:
the voice coil and actuator arm of the second e-block are smaller than the voice coil and actuator arm of the first e-block, the first e-block is configured and arranged for read/write access to data stored in an inner region of the storage medium, relative to the spindle, the second e-block is configured and arranged for read/write access to data stored in an outer region of the storage medium, relative to the spindle, the base deck is rectangular and has a length that is greater than its width, the spindle and storage medium are offset laterally along the length of the base deck in a direction toward the second e-block, and the axis and voice coil of the second e-block are confined in a space laterally between the storage medium and corner sidewalls of the base deck that is smaller than a space between the storage medium and corner sidewalls of the base deck in which the axis and voice coil of the first e-block are confined.

16. The apparatus of claim 14, wherein:

the limited rotation of the respective voice coils is facilitated about their respective axes for rotating the read/write heads across the storage medium for data access to the respective first and second portions of the storage medium, and the respective sidewalls in each corner intersect an arc along which the respective voice coils traverse.

17. The apparatus of claim 14, further including a read/write control circuit configured and arranged to respond to requests for data accesses by:

in response to a request for access to data near an inner region of the storage medium near the spindle, selecting the first e-block and actuating the first e-block to position its read/write head for accessing the requested data; and in response to a request for access to data near an outer region of the storage medium near the storage medium's perimeter, selecting the second e-block and actuating the second e-block to position its read/write head for accessing the requested data.

18. A method comprising:

providing a hard disc drive apparatus having:
  a base deck,
  a storage medium connected to a spindle and motor in the base deck,
  a first e-block mounted in a first corner of the base deck and including an actuator arm, a read/write head attached to the actuator arm, and a voice coil connected to the actuator arm and configured to position the read/write head along an arc over a first portion of the storage medium by rotating the actuator arm, and
  a second e-block mounted in a second corner of the base deck that is opposite the first corner, the second e-block including an actuator arm that is shorter than the actuator arm of the first e-block, a read/write head attached to the actuator arm, and a voice coil connected to the actuator arm and configured to position the read/write head of the second e-block along an arc over a second portion of the storage medium by rotating the end of the actuator arm of the second e-block, the second portion being different than the first portion;

utilizing the spindle and motor to rotate the storage medium for read/write access thereto;

providing read/write access to the first portion of the storage medium with the first e-block by utilizing the voice coil to rotate the actuator arm about an axis to move the read/write head along the first arc extending over the first portion of the storage medium; and providing read/write access to the second portion of the storage medium with the second e-block by utilizing the voice coil to rotate the actuator arm about an axis to move the read/write head along the second arc extending over the second portion of the storage medium, the second portion of the storage medium being different than the first portion of the storage medium.

19. The method of claim 18, further including:

in response to receiving a read/write access request, identifying one of the first and second portions of the storage medium to be accessed based on the request;

selecting one of the first and second e-blocks based on the identified one of the first and second portions of the storage medium to be accessed;

controlling the selected one of the first and second e-blocks to position the actuator arm and read/write head thereof for serving the request; and providing the requested read/write access via the positioned actuator arm and read/write head of the selected one of the first and second e-blocks.

* * * * *